INVENTOR.
HORACE C. TALCOTT
BY Bernard E. Franz
ATTY.

DATA TRANSMISSION SUBSET

Filed Sept. 25, 1967 2 Sheets-Sheet 2

United States Patent Office 3,517,129
Patented June 23, 1970

3,517,129
DATA TRANSMISSION SUBSET

Horace C. Talcott, Downers Grove, Ill., assignor to Automatic Electric Laboratories, Inc., Northlake, Ill., a corporation of Delaware Filed Sept. 25, 1967, Ser. No. 670,114
Int. Cl. H04m *11/06*
U.S. Cl. 179—2 3 Claims

ABSTRACT OF THE DISCLOSURE

Apparatus for connecting data processing equipment to voice frequency communication channels including equipment for transmission and reception of FSK signals and conversion to serial binary signals for use with data processing systems, with provision for rapid switching between transmit and receive modes.

BACKGROUND OF THE INVENTION

Field of invention

The present invention relates to electrical communication systems for the handling of intelligence in data processing systems between two points located remotely from each other. More specifically, the present apparatus is a subset or data set required for the interconnection of data processing equipment over communication channels such as telephone lines. Equipment of this sort is required by common carriers so that proper utilization and control of communication facilities is maintained.

Description of prior art

Data transmission common carrier subsets are well known. These subsets include units for the transmission of data over voice grade, telegraph, and wide band channels. Various transmission speeds from 20 to 2400 bits per second are commonly utilized with arrangements for use on both two and four wire transmission facilities. Some of these subsets are adapted so that data may be received asynchronously, (received at the subset irregularly) while others require that data be furnished to the subset at a regular periodic rate (synchronous). Both serial and parallel transmission of information is employed in these devices.

Data sets most similar to that in the present disclosure are those manufactured by Automatic Electric Company and designated as AE2024 and those manufactured by Western Electric Company designated WE202. Data sets like the AF2024 and WE202 requires a relatively long time for shifting from transmit to receive modes so as to permit line settling and the elimination of possible spurious signals from reaching the receiver portions of the subsets during the switching period. In view of the high cost of data transmission channels, maximum utilization of the channels for actual data transmission is highly desirable.

SUMMARY OF THE INVENTION

This invention pertains to a data set used for the transmission and reception of information from, and to data processing equipment over two wire voice frequency communication facilities. The present data set is of the non-synchronous type, wherein data can be extended to the subset irregularly. Data received from data processing equipment is transmitted serially and sent sequentially. The present data set is intended primarily for usage over so called leased private lines, rather than party lines, providing direct communication between two points.

The present data set is of the continuous carrier type, wherein, carrier is transmitted constantly either in one direction or the other while retaining independent control of clock gating functions. In this manner a finite signal to noise ratio is established and the receiver portion never is caused to operate at a threshold of sensitivity. The guard intervals required at the beginning and end of a message are reduced so that a two millisecond minimum turn around time can be realized in contrast to turn around times of twenty milliseconds or more found in prior art data sets.

BRIEF DESCRIPTION OF THE DRAWINGS

FIG. 3 shows the manner in which FIGS. 1 and 2 are to be arranged.

DESCRIPTION OF THE PREFERRED EMBODIMENT

The present data set may be considered as a transceiver capable of transmitting and receiving data at 600 or 1200 bits per second. Data sets such as that disclosed herein frequently find use in supervisory systems where data processing equipment at a master station is used to monitor equipment at a remote station, or in a control system where data processing equipment at a master station may control equipment at a remote station.

Data received by the data set is shifted between two discrete carrier frequencies and transmitted over voice band width frequencies on two wire facilities. When receiving, the data set receives the data signals and processes them for relaying to data processing equipment. The present system employs frequency shift keying serial transmission because of its freedom from errors. It is designed to interface with data processing equipment employing standard interface circuits in accordance with EIA (Electronics Industries Association) standard RS–232–A. Various options such as line equalizers and carrier controls, permit use in a wide variety of applications and under many different transmission conditions.

The present system is operated on a half duplex basis. Half duplex operation indicates that transmission is possible in either direction, but not in both directions simultaneously. While not shown in the present disclosure the outputs to data processing equipment may be equipped with binary amplifiers to convert unipolar negative signals to EIA bipolar signals. These amplifiers are not necessary if the processing equipment uses unipolar negative logic coding; that is binary zero represents —0.5 volts; binary one represents —6 volts, or similar values.

Figure 1:
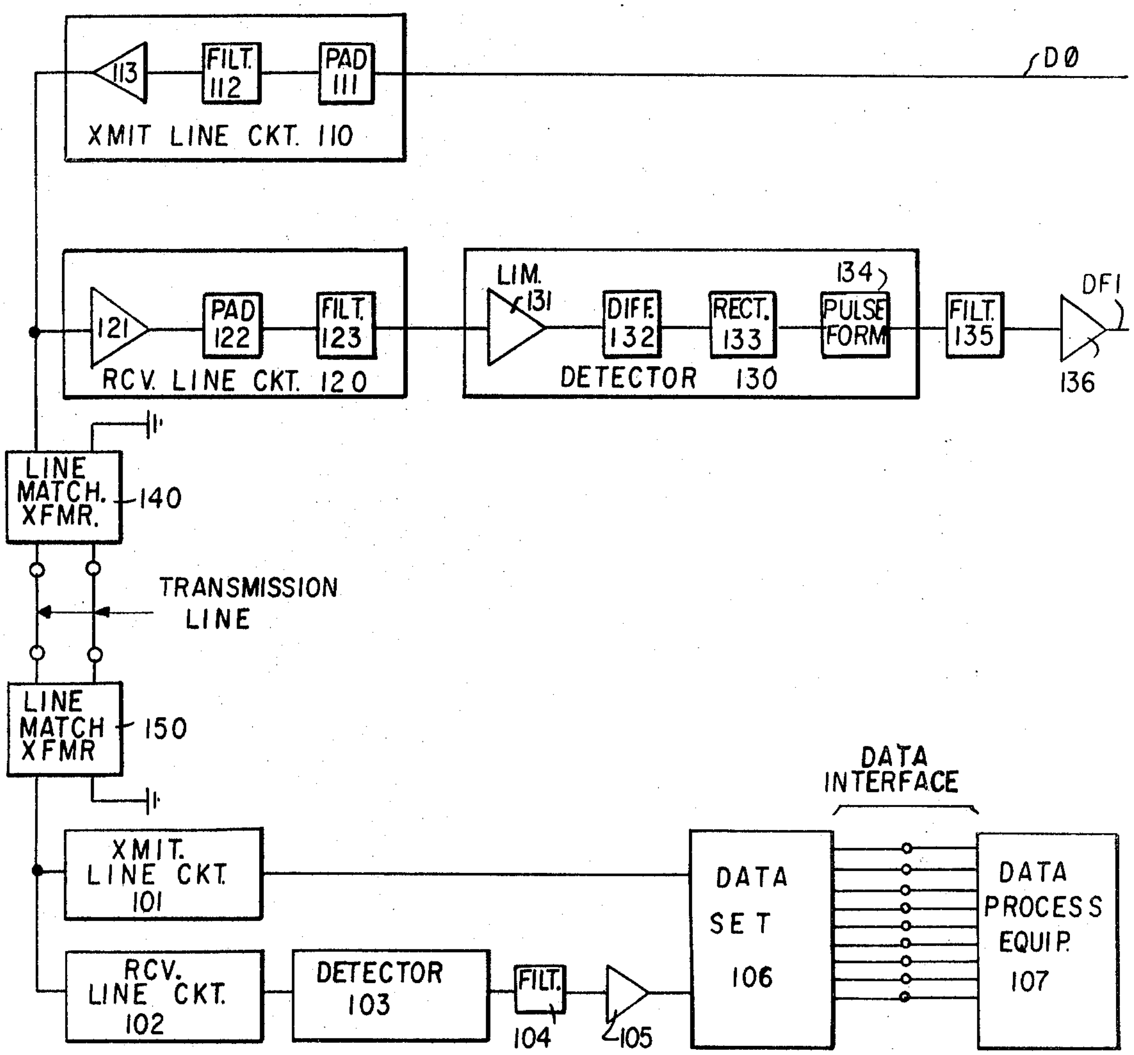
FIGS. 1 and 2 comprise a diagram showing the circuitry in logical form of a first data set connected by appropriate circuitry to a similar second data set (disclosed in block form) over a two wire transmission line.
Figure 3:
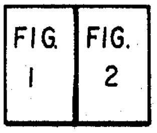

The line equipment for the present system shown in FIG. 1 consists of line matching and isolating transformers, filters and buffer amplifiers for both received and transmitted carrier signals. The receiving sensitivity of the data set is established by strapping of adjustable pads included in this circuitry. The transmitter output is set by a similar arrangement. A line matching transformer provides the proper connection for matching the impedances of various transmission lines.

Figure 2:
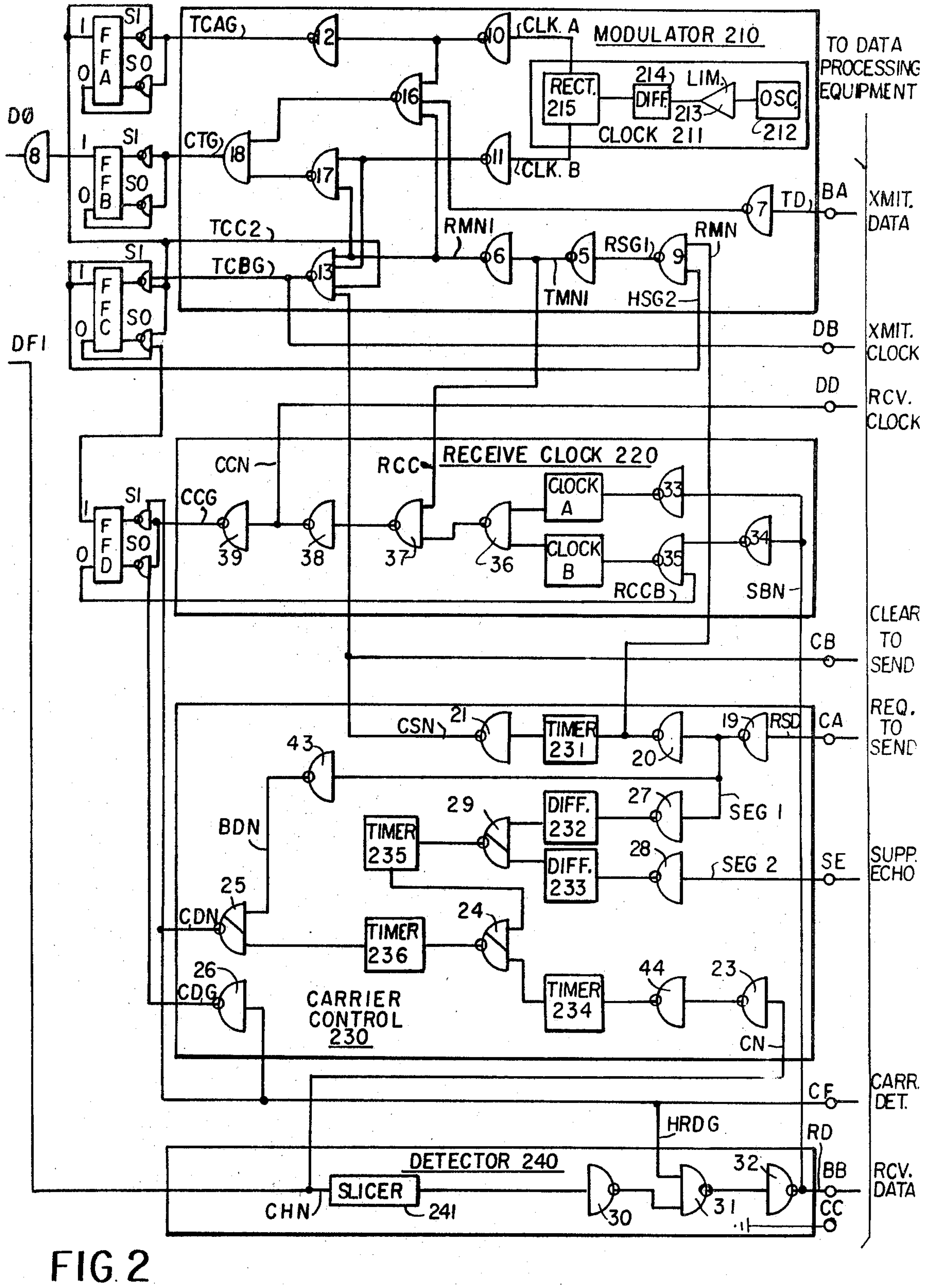

Referring now to FIG. 2, the terminals shown extending to data processing equipment comprises the connection to the interface or line of demarcation between the transmission system and the processing system. These interconnections are referred to as interface circuits.

The following describes the functions of the various interface circuits. The transmit data (BA) carries data signals from the data processing equipment to the data set. The receive data circuit (BB) delivers the data which has been recovered from the carrier line signals to the data processing equipment. The request to send (CA) in its "on" state conditions the modulator for data transmission. After this circuit is turned on, the data set generates an "ON" signal to the data processing equipment over the clear to send (CB) circuit. When circuit CA is turned off circuit CB follows immediately. In half duplex service the "off" state of circuit CA holds the data set in the receive mode. When circuit CA goes from "on" to "off" (transfer from transmit mode to receive mode) the suppress echo (SE) function is initiated to clamp the receive data circuit (BB) at the rest state for a predetermined interval.

The "on" state of the carrier detect circuit (CF) indicates that carrier is being received. The "off" state of this circuit indicates the end of transmission or a false condition. The suppress echo circuit (SE) is used to blind the receiver at the end of each message before carrier ceases. The data set ready circuit (CC) merely indicates the availability of the data set to the data processing equipment by appropriate means such as fuses, relays, etc. Power failure can be detected at this point.

The transmit clock (DB) provides signals to establish the data rate to the data processing equipment, preparatory to transmission. The receive clock circuit (DD) provides signals for timing information to the data processing equipment, for regenerating data delivered over the receive data circuit (BB).

The polarity sense of the data signal interface circuits is with respect to carrier frequencies and the REST state, is normally arranged as specified by EIA RS–232–A standard referred to above, as follows:

(A) Negative—mark/off/low carrier
(B) Positive—space/on
(C) Rest—mark (held between characters and messages)

The modulator circuit 210 includes the transmitter clock 211, which in connection with the circuitry of the associated flip-flops determines the carrier frequencies of 1200 and 2400 c.p.s.

The transmit clock output wave form is a rectangular pulse approximately 10 microseconds wide, its leading edge coinciding with data signal transitions on the transmit data (BA) circuit. Positive clock pulses are normally provided. Also included in the modulator is control circuitry to supply the necessary timing and control functions for the data set. The receive clock 220 provides timing information to the data processing equipment for regeneration of the received data over the receive data interface circuit. Like the transmit clock signals, receive clock signals are also 10 microsecond pulses, but are of negative polarity. The leading edge of a pulse indicates the center of each data bit on the receive data circuit. The carrier control circuit 230 provides timing functions associted with both transmitting and receiving. For example, a one millisecond "clear to send" delay is provided by this circuit as well as a two millisecond "supress echo" period. These values are applied for half duplex service over private line facilities. An optimum combination of timing can be determined from the communication channel characteristics. Noise, return losses, attenuation, propagation constant and line lengths are pertinent factors in this determination. Some of the timing control (clear-to-send and suppress echo) can be provided in the design of the processing equipment; however since timing is a function of the transmission channel, it is more practical to locate these controls in the data transmission equipment. The detector circuit 240 also shown in FIG. 2 is of the zero crossing type which demodulates received data signals, then prepares and sends them to the processing equipment. This circuit in connection with the line circuitry provides non-synchronous data recovery. The four flip-flops shown in FIG. 2, flip-flops FFA, FFB, FFC and FFD are used to switch the state of the transmitted and received signals.

To explain the operation of the data set in accordance with the present invention it is necessary to understand typical data transmission and data receive cycles. As mentioned previously the data set disclosed herein operates in a half duplex manner over a two-wire transmission facility alternating between transmit and receive modes.

During the transmit mode data processing equipment will send a request to send "on" indication to the data set via interface terminal CA. This may be initiated by actuating a key or button on the data processing equipment or some automatic device may be used to send this indication at predetermined intervals. The request to send "on" indication from the processing equipment conditions the data set to send a carrier frequency of 1200 c.p.s. (MARK) or 2400 c.p.s. (SPACE) signal over the transmission line. The request to send "on" indication also starts the clear to send timer 231 included in carrier control circuit 230.

The data set will then send to the data processing equipment (after the clear to send timer times out) a clear to send "on" indication via interface terminal CB denoting that the data set is prepared to accept signals for transmission. Both the request to send and clear to send circuits switch to "off" simultaneously. The data set then sends transmit clock signals via interface terminal DB to the data processing equipment to establish the data rate.

The data processing equipment will then send data signals in serial binary form to the data set. Transmission is usually handled at rates of 600 or 1200 bits per second. The data rate is set by the transmit clock pulses generated by the data set and extended to the data processing equipment as noted above.

Incoming data signals from the processing equipment via the interface lead BA shift the carrier between two frequencies. A MARK or binary "1" data signal shifts the carrier to transmit 1200 cycles, and a SPACE or binary "0" data signal will shift the carrier to 2400 c.p.s. The data signals in high and low frequency carrier form are sent through the line circuit where they are filtered, amplified and shaped. After the signals have been conditioned for transmittal, the signals are applied through an impedance matching line transformer to the transmission line for transmission to a distant station.

At the end of the message, the request to send circuit via interface terminal CA switches from "on" to "off," cutting off the transmit cycle and enabling the receive cycle of the data set. The end of message can be introduced in various ways. The message itself may include an end of message code, or an operator may initiate some type of end of message indication. This signal is a function of the processing equipment and not of the data set. The data set receives the request to send "off" indication at terminal CA and in response thereto switches from the transmit to receive mode.

When the request to send circuit switches from "on" to "off," the suppress echo circuit via interface terminal SE is enabled to clamp the receive data circuit at its rest state for a predetermined interval as mentioned previously.

While in the receive mode the data set is conditioned to receive valid carrier from a distant station by the carrier detect circuit connected to the data processing equipment via interface terminal CF. During the receive operation data signals are received by the line circuit as high and low frequency carriers. In the line circuit of FIG. 1 data signals are passed through an amplifier and a receiving filter which rejects signals outside of the 1200 to 2400 c.p.s. band. The remaining signals then pass through a zero crossing detector consisting of a limiter, differentiator, and pulse former that form a portion of the detector circuit shown in FIG. 1. The zero crossing detector will recover the base band information by linear frequency demodulation. The output of the detector then passes through a data filter and amplifier for extension via lead DF1 to detector 240 of FIG. 2. In detector 240 the signals pass through a level slicer 241, where the signals are shaped into a rectangular waveform at voltages compatible with the negative logic of the data set. The signals are then sent in serial binary form to the data processing equipment. The receive clock circuit 220 generates and extends to the data processing equipment receive clock pulses which provide the necessary timing information for regeneration of the data delivered to the processing equipment via the receive data interface circuit. The data set will remain in the receive mode until it receives a suppress echo signal via lead SE from the data processing equipment.

The following detailed description indicates the operation of the data set during transmission of data signals. In this description, the terms "on" and "off" refer to signals at the interface. The terms positive and negative are used to explain the signal traced through the data set circuits.

A data set system operated in accordance with the present invention transmits carrier constantly in either one direction or the other. The guard intervals at the beginning and the end of the message are so reduced that a two millisecond turn around time (change from transmit to receive mode) can be obtained.

The carrier frequency is generated during the transmit mode in the following manner. Oscillator 212 shown as a portion of modulator 210 generates a frequency of 2400 c.p.s. The output of the oscillator is shaped and spiked by the limiter 213 and differentiator 214. This signal is then rectified by full wave rectifier 215 and extended as clock pulses A and B. Clock pulses A and B determine the output of flip-flops FFA and flip-flop FFB shown in FIG. 2. The clock pulses are blocked from performing any useful function while the data set is in the receive or idle state by the closing of various gates, preventing the passage of signal through these gates. To understand operation of the present data set the condition of the circuitry while in the receive or idle state will be mentioned first followed by its operation into the transmit mode. While in the receive mode or idle state, gates 16, 17 and 13 are closed by positive potential on lead TMN1. This condition results from the presence of an "off" or negative condition on the interface circuit request to send (CA). The request to send "off" indication places a negative signal on lead RSD which is inverted to "on" by gate 19 and extended to gate 20 where it is again inverted. The negative output or "off" from gate 20 is extended to gate 9 by lead RMN. The negative signal on lead RSG1 is inverted by gate 5 and extended as a positive signal to close gates 13, 16 and 17.

While in the receive mode, the negative signal on lead RSD is also extended through the timer 231 to gate 21. Here the signal is inverted and extended as a positive signal to gate 13. The positive signal appearing on one of the inputs to gate 13 inhibits this gate, blocking transmit clock pulses to the data processing equipment via the transmit clock interface circuit DB.

When the request to send "on" indication is initiated by the data processing equipment, a positive signal is extended at terminal CA to lead RSD thereby extending a negative signal on lead TMN and also a negative signal on lead CSN. The paths for these circuits are the same as described previously except the signal polarities are opposite. The negative signal on lead TMN1 opens gates 13, 16 and 17 and the negative signal on lead CSN also acts to open gate 13. With these gates open clock B pulses are extended to flip-flop FFB via gates 11, 17, 18 and lead CTG. Flip-flop FFB changes state on alternate pulses to produce a rectangular waveform at the fundamental rate of 1200 c.p.s.

Gate 16 is initially inhibited by the REST state of the data processing equipment. During the rest state a negative signal is extended from the data processing equipment over lead TD and via interface terminal BA. This negative signal is inverted by gate 7 and the positive output is extended to gate 16. When gate 16 is opened A clock pulses also drive flip-flop FFB which then changes state at twice the previous rate, producing a 2400 c.p.s. output.

When the request to send "on" indication is initiated by the data processing equipment via interface terminal CA the receive circuit of the data set is clamped to prevent the receive circuit from picking up signals from the carrier being transmitted by the data set.

A request to send "on" indication from the data processing equipment places a positive signal on lead RSD. This signal is inverted by gate 19 and extended via lead TMN through gate 43 and lead BDN where it is further extended to NOR gate 25. The output of this gate is extended to detector gate 31 via leads CDN and HRDG. This signal inhibits gate 31, preventing data from reaching the data processing equipment via the data interface circuit through terminal BB.

Gate 12 is always open to permit the extension of A clock pulses continually. The logic of flip-flop FFC and gates 9, 5 and 6 are wired so that flip-flop FFB extends signals when either the request to send interface circuit is in the "on" condition or the output of flip-flop FFC is an "off" signal. The circuit path of the request to send "on" signal consists of a positive signal extending from the data processing equipment via interface terminal CA and lead RSP to gate 19. The inverted output of gate 19 is extended to gate 20 where it is again inverted to a positive signal and extended to gate 9 of the modulator circuit via lead RMN. The signal is inverted again by gate 9 and extended as a negative signal to gate 5 via lead RSG1. The signal is inverted again by gate 5, the positive signal being applied to gate 6 where it is again inverted as a negative signal on lead RMN1 and extended to gate 16 and gate 13. The negative signal on gate 16 keeps the gate open, permitting A clock pulses to be extended to flip-flop FFB via gates 10, 16, 18 and lead CTG. At gate 13 the negative output of gate 6 is inverted to positive and extended to flip-flop FFC. The negative output of flip-flop FFC is extended to gate 9 via lead HSG2. The output of gate 9 appear on lead RSG1. The polarity of the signal extended on RSG1 is the same as the polarity when the request to send "on" signal was extended; therefore, the circuit from this point on is the same as previously described. Gate 16 remains open permitting A clock pulses to be extended to flip-flop FFB until the request to send circuit changes to its "off" state. When this occurs, gate 16 will be inhibited, blocking A clock pulses from flip-flop FFB. As mentioned previously, carrier is generated continuously so the only important function of the request to send "on" indication is to start the clear-to-send timer 231.

The negative signal on lead CSN relinquishes control of gate 13 to signals extended over leads RNM1 and TCC2 which control the gating of B clock pulses to the data processing equipment via the clock interface circuit (DB). The negative output of flip-flop FFA which has been following the alternate A clock pulses inhibits gate 13 to block the alternate B clock pulses from the data processing equipment.

Data signals to be transmitted are extended to the data set from the data processing equipment via the data transmit interface (BA) in serial binary form. These data signals are synchronized to the transmit clock pulses by the data processing equipment within plus or minus 25 percent of a data bit interval.

During each bit interval, A clock pulses will be either passed or blocked at gates 16, depending upon the state of the data signal. A mark (binary 1) signal via the transmit data interface circuit and lead TD is inverted by gate 7 and the positive output is extended to gate 16. The positive signal to gate 16 inhibits the gate blocking A clock pulses from flip-flop FFB. Thus, only B clock pulses are extended to flip-flop FFB resulting in a 1200 c.p.s. output. A space (binary 0) extends a positive signal via the transmit data interface circuit, is inverted by gate 7, and the negative output is extended to gate 16. This negative signal opens gate 16 so that both A and B clock pulses are extended to flip-flop FFB. This combination of A and B clock pulses produces a 2400 c.p.s. bit rate.

The circuit path of the A clock pulses extends from the rectifier 215 through gate 10, gate 16 and gate 18, then via lead CTG to flip-flop FFB. B clock pulses extend from the rectifier through gate 11, gate 17 and gate 18, and thence over lead CTG to flip-flop FFB. The output pulses from flip-flop FFB are extended to the line circuit of FIG. 1 where they are filtered and amplified before being sent out via the transmission line to a distant station. When the request to send interface circuit at terminal CA goes to its "off" condition gate 16 will be inhibited by the "on" signal from flip-flop FFC which reverses its state, and also by the reversal of polarity on lead RNM.

The following description is drawn to the transition from transmit to receive modes of operation of the data set.

In two-wire half-duplex operation, even with the almost instantaneous turn around of the present data set, spurious echoes may be present on the transmission lines when the data set changes from the transmit mode to the receive mode. During this transition the receive circuit is clamped to prevent these echoes from activating the receive circuit prematurely. The clamping interval being of a short duration (approximately two milliseconds) to allow these echoes to subside. This is referred to as the suppress echo interval. The suppress echo function is initiated by a positive signal on lead SEG2. This signal can be introduced either by a clock pulse from the data processing equipment at the end of the message, or via lead TMN when the transition from transmit to receive mode occurs. Regardless of where the signal originates, the circuit is the same. A positive signal on lead SEG2 or SEG1 is inverted by gate 28 or 27 extended to associated differentiators 233 or 232, respectively, where the signal is shaped to a sharp spike. The output of either differentiator is extended through gate 29 to the timer 235 where the signal is delayed for approximately two milliseconds before being extended to gate 24. The signal is inverted to positive by gate 24 and extended through the timer 236 and then to gate 25. The signal is again inverted by gate 25, and applied to flip-flop FFD.

In the receive mode, receive clock pulses generated by the data set provide timing information to the data processing equipment for regeneration of data delivered on the receive data circuit. During the transmit mode, when no carrier is being received, flip-flop FFD remains reset and its zero output inhibits clock 220 over lead RCCB and through gate 35. The REST state of the receive data circuit inhibits clock A via lead SBN and gate 33.

Upon receipt of valid carrier from the remote station, leads CDN and CDG extending from gates 25 and 26 of carrier control circuit 230, switch polarities, transferring the control input from the set "one" to the set "zero" input of flip-flop FFD. The circuit path is similar to that previously outlined. The first bit of the message must provide a change from the rest state. A negative signal on lead SBN closes gate 33 to start clock A of receive clock 220. The first clock pulse occurs one-half bit interval later. Successive pulses are spaced apart by a full bit interval. A negative potential on lead RCC holds gates 37 and 38 open so that A clock pulses appear on lead CCN and CCG for distribution to flip-flop FFD and the data processing equipment through the receive clock interface circuit at terminal DD.

Flip-flop FFD is reset by the first pulse, causing its zero output and lead RCCB to go negative, thus relinquishing its control over gate 35 and clock B. Succeeding pulses will have no effect upon flip-flop FFD which remains in the reset state for the duration of the message. When the next transition occurs in the receive data, a positive signal on lead SBN will stop clock A and start clock B, which then generate the successive bit timing pulses. Clocks A and B of receive clock 220 run alternately under the control of lead SBN which follows the received data transitions throughout the message. At the end of the message the data processing equipment may indicate that the last bit has been clocked by gating that clock pulse to ground and extending it to the suppress echo circuit via the suppress echo interface terminal SE and then over lead SEG2. Leads CDN and CDG switch states immediately to prime flip-flop FFD.

The last clock pulse sets flip-flop FFD whose zero output closes gate 35 via lead RCCB to inhibit the clock pulses. Lead CDN in going negative at gate 31 also places the receive data outputs into the rest state, stopping the A clock pulses. The "1" output of flip-flop FFD is extended to the SO input of flip-flop FFC, to change the state of flip-flop FFC. The resultant output signal from the "1" output of flip-flop FFC is extended via lead HSG2 to gate 9 to place tone on the line in the manner previously described, effectively turning the transmitter on. No transmit clock pulses, however, are received at interface terminal DB until a request to send signal is received from the data processing equipment. However, carrier is transmitted over the line. If the last bit received is opposite the rest state, the final transition will transfer the control to clock B, and the last pulse will occur one-half bit interval later because the initial pulse from each clock is always delayed by one-half bit. If the last bit is the same as the rest state no transition will occur and B clock pulses will continue and the last clock pulse will occur a full bit interval after the suppress echo signals. The receive circuit will remain blinded to any line signals, for the duration of the suppress echo interval, which is equal to approximately two milliseconds as noted above.

Incoming data signals received at the line circuit of FIG. 1 of the data set are received as two discrete signal frequencies. Typical values for these signals are 1200 and 2400 c.p.s. The function of the receive circuits is to convert these signal frequencies into binary form before extending them to the data processing equipment. As can be determined by reference to FIG. 1, incoming signals are received from the transmission facility by the receive line circuit where the signals are amplified and filtered, extended through the zero crossing detector which, as noted previously, consists of a limiter, differentiator and pulse former. The signals are then detected and shaped into appropriate rectangular waveforms for transmission in serial binary form to the data processing equipment via the receive data interface circuit BB.

At the conclusion of the message, carrier is turned off by the transmitting station and the data set will remain in the receive mode until it receives a request to send indication, in which case it will return to the transmit mode.

What is claimed is:

1. A data processor, a communication channel, and a data set connected between said processor and said channel, operated to transmit a carrier over said channel, and to receive data from said processor and modulate said carrier to transmit signals indicative of said data over said communication channel, said data set including: switching means operated in response to the termination of data received from said processor, to terminate the transmission of signals over said communication channel, said switching means further operated to condition said data set to receive modulated signals from said communication channel; receiving means operated in response to receipt of modulated signals to demodulate said signals and transmit said demodulated signals to said processor; first means operated in response to the termination of modulated signals received over said communication channel to transmit an unmodulated carrier over said communication channel, and condition said data set to receive data from said processor; and second means operated in response to said conditioning and in response to data received from said processor to modulate said carrier to transmit signals indicative of said data over said communication channel.

2. A data set as claimed in claim 1 wherein; said first means include: carrier generating means connected to said communication channel; and first gating means connected to said processor and said generating means, operated in response to receipt of a signal from said processor indicative of the termination of receipt of data, to operate said generating means.

3. A data set as claimed in claim 2 wherein said second means include: carrier modulating means connected to said carrier generating means; and second gating means connected to said processor and to said modulating means operated in response to data received from said processor to modulate said generating means.

References Cited

UNITED STATES PATENTS 2,828,362 3/1958 Darwin ---------------- 179—2

KATHLEEN H. CLAFFY, Primary Examiner

T. J. D'AMICO, Assistant Examiner